United States Patent
Gendelman et al.

(10) Patent No.: US 6,442,489 B1
(45) Date of Patent: Aug. 27, 2002

(54) METHOD FOR DETECTION AND MONITORING OF HYDROCARBONS

(76) Inventors: Edward Gendelman, 6590 S. Madison Ct., Littleton, CO (US) 80121; Boris M. Grafov, 43/2 Profsoyuznaya, Apt. 469, Moscow, 117420; Oleg L. Kuznetsov, 69/3 Leninsky, Apt. 20, Moscow, 117296, both of (RU); Haim Sokolin, 12/19 Sulam Yakov, Ramot Alef, Jerusalem, 97729 (IL); Sergei L. Aroutyunov, 2/1 Kuznechnaya, Apt. 4, Pyatigorsk, 357000 (RU); Sergei M. Karnaukhov, 14 Prostornaya, Apt. 82, Orenburg, 460053 (RU); Yuri V. Sirotinsky, 12/4 Sevastopolsky, Apt. 20, Moscow, 117447 (RU)

(*) Notice: Subject to any disclaimer, the term of this patent is extended or adjusted under 35 U.S.C. 154(b) by 0 days.

(21) Appl. No.: 09/365,697

(22) Filed: Aug. 2, 1999

(51) Int. Cl.[7] ............................................... G01N 15/08
(52) U.S. Cl. ............................................ 702/12; 702/13
(58) Field of Search .......................... 181/106; 702/14, 702/16, 1, 12, 13; 367/59, 72; 703/9, 10

(56) References Cited

U.S. PATENT DOCUMENTS 4,926,392 A * 5/1990 Handley et al. .............. 367/59
5,181,171 A * 1/1993 McCormack et al. ........ 364/421
5,930,730 A * 7/1999 Marfurt et al. ................ 702/16

OTHER PUBLICATIONS

Hirokazu, Moriya et al., Precise detection of a P–Wave in low signal to noise signal using time frequency representations of a triaxil Hodogram, Sep.–Oct. 1996, Geophysics vol. 61 # 5, pp. 1453 to 1466 and 15 figures.*

* cited by examiner

Primary Examiner—Edward Lefkowitz
Assistant Examiner—Victor J. Taylor
(74) Attorney, Agent, or Firm—Edwin H. Crabtree; Ramon L. Pizarro; Donald W. Margolis

(57) ABSTRACT

A method for detection and monitoring of hydrocarbon deposits by measuring infrasonic spectral characteristics of microseismic noise of the earth. The method is used onshore and offshore for detection of hydrocarbon deposits and for monitoring of producing oil and gas fields and subsurface storage of natural gas. In one method of the invention, at least one receiver of seismic vibrations capable of recording vibrations in the infrasonic range is placed over an area being surveyed. The spectral characteristics of the microseismic noise of the earth recorded within a 2 to 5 Hz frequency range are used as a "passive" information signal. A hydrocarbon deposit is determined by the presence of a spectral anomaly on a spectrum of the passive information signal relative to a spectrum of an information signal from the area known not to contain hydrocarbons.

24 Claims, 3 Drawing Sheets

Information signal spectrum recorded prior to generating seismic vibrations (B)

Information signal spectrum recorded during generation of seismic vibrations (E)

Product spectrum E/B

Information signal spectrum recorded
prior to generating seismic vibrations (B)

Information signal spectrum recorded
during generation of seismic vibrations (E)

Product spectrum E/B

METHOD FOR DETECTION AND MONITORING OF HYDROCARBONS

BACKGROUND OF THE INVENTION (a) Field of the Invention

The subject invention is in the field of seismic research and is used for exploration and detection of hydrocarbon deposits onshore and offshore, monitoring of producing oil and gas fields, and monitoring of storage of natural gas in natural subsurface reservoirs.

(b) Discussion of Prior Art

At present, substantially all work associated with exploration for hydrocarbon deposits involves, to a lesser or greater extent, seismic prospecting. Traditionally, seismic prospecting consists of recording reflected and refracted wave generated seismic vibrations propagated through the earth's crust, with subsequent mathematical processing of obtained data Methods of seismic exploration know today make use of recorded seismic vibrations with frequencies ranging anywhere from 5–120 Hz. Significant strides have been made in these methods, as well as in mathematical methods for processing of the data. Predominately, vibrators or explosives have been used for the generation of such vibrations. Such procedures have negative ecological consequences for exploration areas. Furthermore, predictions of the presence of hydrocarbon accumulations based on known methods of seismic survey are not precise. Therefore, at least every other will drilled based on conclusions drawn from the traditional seismic exploration for hydrocarbon fields turn out to be erroneously placed. Besides the waste of resources used for drilling of such wells, there is also unfounded damage to the environment.

Heretofore, there has been known seismic prospecting which includes sourcing of seismic vibrations in exploration areas, recording of a data signal and subsequent mathematical processing of the recorded signal. The data signal is recorded with no less than two receivers of the seismic vibrations placed at some distance from each other. Me deficiency of this method of detection is its low accuracy.

A method of vibroseis seismic prospecting is also known and used for exploration of hydrocarbon fields, which includes generation of seismic vibrations with a seismic vibrator, recording of a seismic signal with three component receivers and mathematical processing of this signal. Seismic vibrations are generated within a 1–20 Hz range for not less than 3 minutes. Seismic vibrations are recorded for not less than 20 minutes before generating the seismic vibrations and then within 5 minutes before generating the seismic vibrations. It was proposed that the seismic background noise is to be recorded as a seismic signal. Presence of a hydrocarbon field was judged based on the area increase under the spectral curve during recording of seismic background after generation of seismic vibrations has stopped in comparison with recording of seismic background before generation of seismic vibrations started. The deficiency of this method is its low accuracy.

SUMMARY OF THE INVENTION

A primary object of the subject invention as described herein is development of a more precise method of exploration and detection of hydrocarbon deposits onshore and offshore.

Another object of this invention is development of a method for monitoring of producing oil and gas fields.

Still another object of the invention is the development of a method for monitoring the fill level of subsurface natural gas storage.

In one method of the invention at least one receiver if seismic vibrations capable of recording vibrations in the infrasonic range is placed over an area being surveyed. The spectral characteristics of the microseismic noise of the Earth recorded within a 2–5 Hz frequency range are used as the information signal, "passive variant". A hydrocarbon deposit is determined by the presence of a spectral anomaly on a spectrum of the passive information signal relative to a spectrum of an information signal from the area known not to contain hydrocarbons. In another method of the invention, seismic vibrations are generated over an area being surveyed using, as an example, a seismic vibrator. At least one receiver of seismic vibrations is placed over an expected hydrocarbon deposit. An "active" information signal is recorded before and during the generation of seismic vibrations within a 2–5 Hz frequency range. A hydrocarbon deposit is determined by the presence of a spectral anomaly on a spectrum of the active information signal relative to the spectrum of the passive information signal at the same point. The invention provides for a direct method of detection of hydrocarbon deposits.

These and other objects of the present invention will become apparent to those familiar with geophysical oil and gas prospecting and acoustic research when reviewing the following detailed description, showing novel methods and detailed steps of the methods as herein described, and more particularly defined by the claims it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate accompanying drawings complete preferred embodiments in the present invention according to the best modes presently devised for the practical application of the principles thereof, and in which.

DESCRIPTION OF THE PREFERRED EMBODIMENTS

Figure 1:
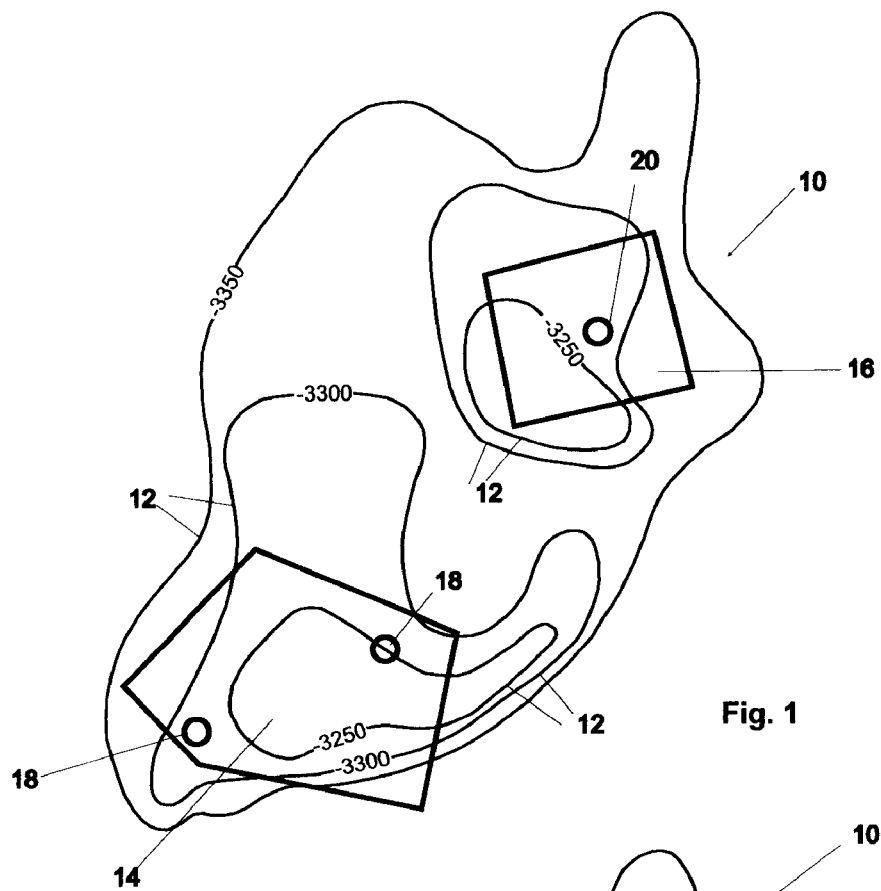
FIG 1 is an example of a subsurface structure map of a prospective exploration area. The prospective area is an actual example of a subsequently developed oil and gas field found in the Orenburg region of Russia. Two sectors, a lower sector and an upper sector, on the map were identified as prospective for oil and gas by conventional geology and seismic techniques. Three well locations were projected as shown. Then the two sectors were planned for surveying using the methods described herein.

The following described method, so called "passive" variant, is proposed for detection of hydrocarbon deposits onshore. At least one receiver of seismic vibrations capable of recording at least one data component in the infrasonic range is placed over the survey area. The spectral characteristics of earth's microseismic noise is measured within 2–5 Hz frequency range as the information signal. The signal is recorded simultaneously on all components being measured. Presence of a deposit is determined based on a spectral anomaly of the passive information signal relative to an information signal from an area known not to contain hydrocarbons. When this method is used, it is preferable to record the information signal for no longer than 60 minutes. When using at least two receivers of seismic vibrations, they are placed not more than 500 meters apart from each other. Different types of seismic vibration receivers may be used for the methods of the invention described herein, as long as these receivers are capable to recording vibrations in the infrasonic frequency range.

In accordance with a second method, so called "active" variant, the following method is described. In addition to the "passive" method, seismic vibrations are generated using a seismic vibrator. An active information signal is recorded using at least one receiver of seismic vibrations capable of recording vibrations within the infrasonic range of frequencies, as well as simultaneously recording all the components (one or more). Obtained data is mathematically processed. Spectral characteristics of earth's microseismic noise are used as the information signal, which is recorded before the generation of seismic vibrations as well as during the generation of seismic vibrations. Presence of a hydrocarbon deposit is determined based on the appearance of the spectral anomaly on the information signal spectrum recorded during the generation of seismic vibrations relative to the information signal spectrum recorded at the same point before the generation of vibrations.

During the application of the invention, additional recording of the information signal can be made after generations of vibrations have stopped. Preferably, recording times of the information signal are as follows: no more than 20 minutes before generation of seismic vibrations begins; duration of the seismic vibrations generation by a vibrator is at least 3 minutes; and recording of the information signal should preferably last no more than 5 minutes after generation of seismic vibrations when the vibrator has stopped. When at least two receivers of seismic vibrations are used, it is preferable to place them away from each other at a distance not greater than 500 meters, and the receivers should preferably be no more than 500 meters away from the vibrator.

For exploration and detection of hydrocarbon deposits offshore in accordance with "passive" variant, the following applies. A receiver of seismic vibrations is placed on the sea bottom. This receiver should be capable of recording vibrations within infrasonic range of frequencies, as well as simultaneously recording one or more components. Recording of the vibrations is carried out simultaneously along all the components being measured within the 2–5 Hz frequency range. Spectral characteristics of the earth's microseismic noise are used as the information signal. Presence of a deposit is determined based on the appearance of spectral anomaly on the passive information signal within the 2–5 Hz range relative to a passive information signal from an area which is know not to contain hydrocarbons.

When using this offshore method, the passive information signal should preferably be recorded for not less than 40 minutes. If two or more receivers are used, they should be no more than 500 meters apart from each other.

When exploring for hydrocarbons offshore using the active variant method at least one receiver of seismic vibrations should be used. This receiver should be capable of recording at least one data component and be capable of recording vibrations within the infrasonic range of frequencies from the sea bottom. Spectral characteristics of earth's microseismic noise are recorded as the information signal, using at least one seismic receiver, simultaneously along all components being measured. Then acoustic vibrations are generated in water while recording is continued till after the end of the generation of vibrations, Presence of a hydrocarbon deposit is determined based on the appearance of spectral anomaly in the 2–5 frequency range of the active information signal, recorded while vibrations were being generated or after the generation has stopped, relative to spectral characteristics of a passive information signal obtained before the generation of vibrations at the same location.

To map the deposit, the above procedures are repeated at other points along the proposed profile. Vibrations are generated for at least 5 minutes. It would be preferable to begin recording the active information signal at least 10 minutes before the vibrations are started. If two or more receivers are used, it is preferable to have them no more than 500 meters apart from each other on the sea bottom.

To monitor production of oil and gas fields, control points are chosen over a field. Seismic receivers capable of recording at least one component within Infrasonic range are placed at these control points. The receivers periodically measure spectral characteristics of the earth's microseismic noise within the 2–5 Hz frequency range. Presence of a hydrocarbon contact beneath a control point is determined based on disappearance of a spectral anomaly of the earth's microseismic noise in the 2–5 Hz frequency range. Preferably, recording of the information signal is done for 40–60 minutes. Also, seismic receivers are placed near the producing wells. In addition, generation of seismic vibrations is carried out. In this case, recording of the spectral characteristics of the earth's microseismic noise is carried out before and during the generation of the vibrations.

To monitor fill levels of a subsurface storage of natural gas, control points are chosen on the surface over a storage reservoir, which mark the various fill levels. At least one seismic receiver is placed at each point. These receivers should be capable of recording at least one component within an infrasonic frequency range. As gas is removed from or pumped into the reservoir, spectral characteristics of the earth's microseismic noise are periodically measured at control points. Absence of natural gas in the storage reservoir underneath a control point is determined based on an absence of spectral anomalies of the earth's microseismic noise in the 2–5 Hz frequency range Recording of the spectral characteristics of the earth's microseismic noise is preferably carried out for 40–60 minutes. Additionally, generation of seismic vibrations can be carried out. In this case, recording of the spectral characteristics of the earth's microseismic noise is done before and during the generation of the seismic vibrations.

The following drawings disclose in detail an example of the active variant method used in detecting hydrocarbon deposits in an onshore area. It should be kept in mind the method described in the drawings applies equally well to the passive variant method and active variant method for detecting hydrocarbon deposits offshore as well as monitoring oil and gas fields and monitoring subsurface storage of natural gas.

In FIG. 1, an example of a subsurface structure map is illustrated of a prospective exploration area. The structure map is indicated by general reference numeral 10. The map 10 includes a plurality of subsurface contour lines 12, This map is of a prospective area, which is an actual example of a subsequently developed oil and gas field found in the Orenburg region of Russia.

On the map 10 are shown two sectors, a lower sector 14 and an upper sector 16. The sectors 14 and 16 had been identified as prospective for oil and gas prospects by using conventional geology and seismic techniques, and then were planned for surveying using the subject active variant method prior to drilling. In the lower sector 14 are shown two planned well locations 18. Also, one planned well location 20 is shown in the upper sector 16.

Figure 2:
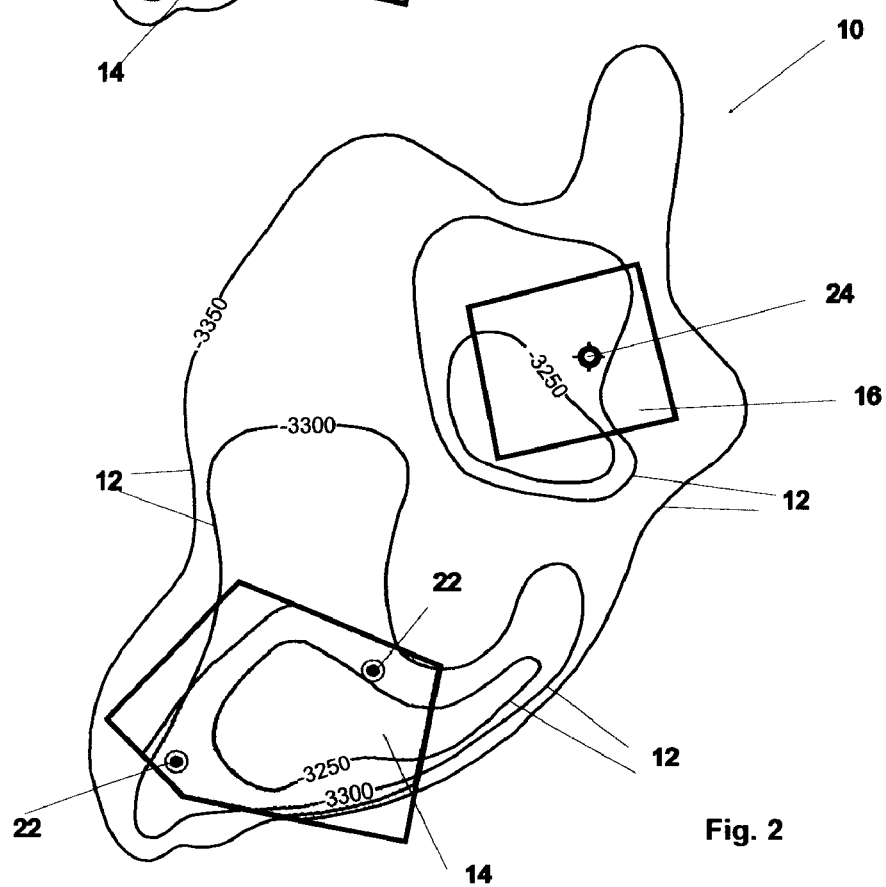
FIG. 2 is similar to FIG. 1. The subject method detected hydrocarbons in the lower sector, as shown, prior to drilling. Also, the method detected no hydrocarbons in the upper sector prior to drilling. Two producing wells were subsequently drilled in the lower sector and a dry hole was drilled in the upper sector.

In FIG. 2, which is similar to FIG. 1, the results of the survey are shown, together with the results of subsequent drilling. Hydrocarbons were detected by the method in the shaded area of the lower sector 14 prior to drilling. Two productive wells 22 are shown having been drilled. The detection method indicated no hydrocarbons in the upper sector 16 prior to drilling the dry hole 24. The upper sector shows a dry hole 24.

Figure 3:
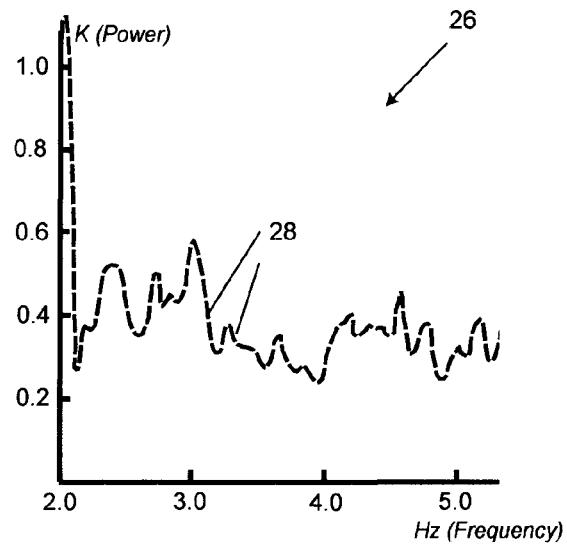
FIG. 3 us a spectrum graph of the "passive" information signal recorded in the lower sector, at a proposed drilling location, shown in FIGS. 1 and 2, prior to drilling.

In FIG. 3, a spectrum graph is shown of one of the well locations in the lower sector 14 as shown in FIGS. 1 and 2. The spectrum graph is shown having general reference numeral 26. The spectrum graph illustrates an information signal 28 taken before the generation of seismic vibrations passive. The spectrum graph 26 is shown with the signal frequency measured in a range from 2.0 to 5.0 Hz and the power amplitude measured in a range of from 0 to 1.0.

Figure 4:
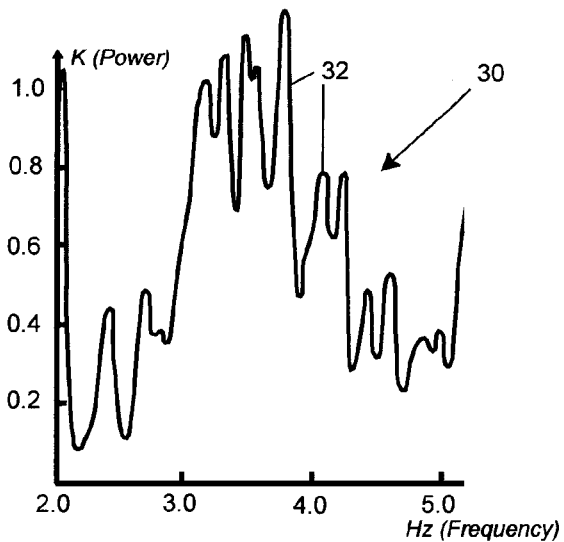
FIG. 4 is the spectrum graph of the active information signal recorded at the same point in the lower sector shown in FIGS. 1 and 2.

In FIG. 4, another spectrum graph is shown, having a general reference numeral 30, Zen from the same location on FIG. 3, but recorded during the generation of seismic vibrations active. The information signal is shown having reference numeral 32. The spectrum graph 30 is also shown with the signal frequency measured in a range from 2.0–5.0 Hz and the power amplitude measured in a range of from 0 to over 1.0.

Figure 5:
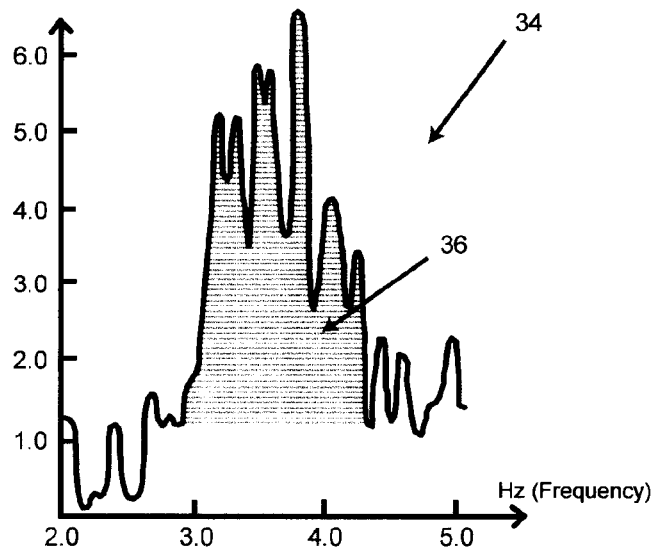
FIG. 5 is a product spectrum of the two spectrums shown in FIGS. 3 and 4. The shaded horizontal lines indicate a presence of a spectral anomaly in the 3 to 4¼ Hz range on the active spectrum relative to the passive spectrum. The spectral anomaly indicated hydrocarbons, which were confirmed by drilling a producing well.

In FIG. 5, a product spectrum (active/passive) of the two spectrum shown in FIGS. 3 and 4 is illustrated. The product spectrum is shown having a general reference numeral 32. A shaded area with horizontal lines is shown clearly indicating the presence of a spectral anomaly 36 in the 3 to 4¼ Hz frequency range, The anomaly is expressed as not having a relatively flat spectrum in the measured frequency range. The spectral anomaly 36 indicates presence of hydrocarbons, which was confirmed by subsequent drilling of productive wells, thereby proving the subject method in fact did correctly indicate the presence of hydrocarbons in the lower sector. The use of product spectrum is employed to "filter out" non-information signal noise, present in the active spectrum.

Figure 6:
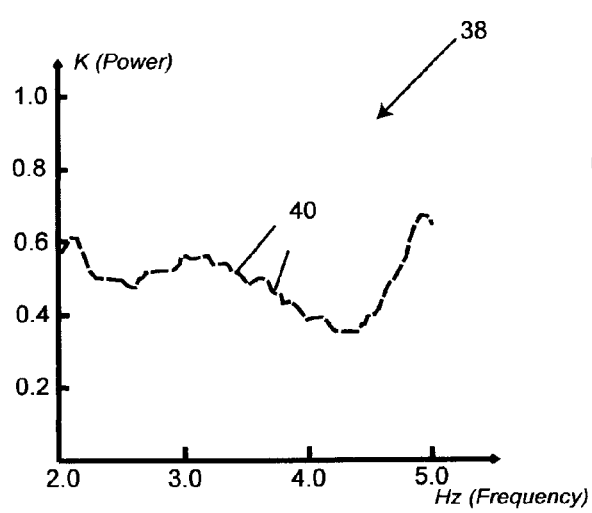
FIG. 6 is a spectrum graph of the "passive" information signal recorded in the upper sector, at a proposed drilling location, shown in FIGS. 1 and 2, prior to drilling.

In FIG. 6, a spectrum graph from the upper sector 16 is shown and having a general reference numeral 38. The spectrum graph 38 illustrates a passive information signal having numeral 40. The information signal 40 is measured before the generation of seismic vibrations. The spectrum graph 38 is shown with a signal frequency measured in a range from 2.0–5.0 Hz and the power amplitude measured in a range of from 0 to 1.0.

Figure 7:
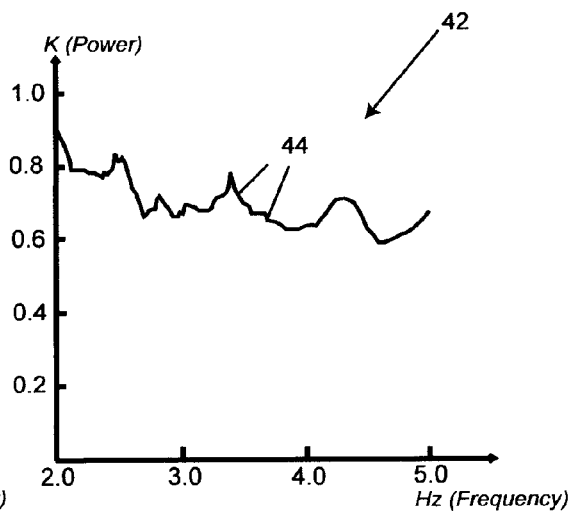
FIG 7. is the spectrum graph of the active information signal recorded at the same point in the upper sector shown in FIGS. 1 and 2.

In FIG. 7, another spectrum graph from the same location in the upper sector 16 is shown having a general reference numeral 42. The spectrum graph 42 illustrates an active information signal having numeral 44. The active information signal 44 is recorded during the generation of seismic vibrations. The spectrum graph 42 is also shown with the signal frequency measured in a range from 2.0–5.0 Hz and the power amplitude measured in a range of from 1 to 1.0.

Figure 8:
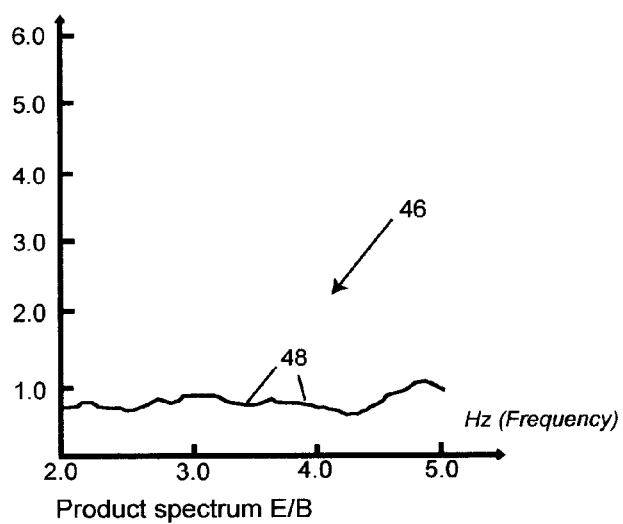
FIG. 8 is a product spectrum of the two spectrums shown in FIGS. 6 and 7. The product spectrum is relatively flat, without the presence of a spectral anomaly, which indicates no hydrocarbons at this location. The location was drilled and a dry hole was evidence as to no oil or gas.

In FIG. 8 a product spectrum (active/passive) of the two spectra shown in FIGS. 6 and 7 is shown. The product spectrum is shown having general reference numeral 46. In this example, the product spectrum 48 is relatively flat without the presence of a spectral anomaly, which indicate no hydrocarbons to be found at this location. To confirm there were no hydrocarbons in the upper sector 16, the well 24, shown in FIG. 2, was drilled and no oil and gas was found.

While the subject methods for detection of hydrocarbons have been shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

What is claimed is:

1. A method for detection of hydrocarbon deposits onshore by measuring infrasonic spectral characteristics of microseismic noise of the earth in a selected area, the steps comprising:

placing at least one receiver of seismic vibrations capable of recording at least one data component within a 2 to 5 Hz frequency range over an expected hydrocarbon deposit onshore in the selected area;

registering at least once the spectral characteristics of the microseismic noise of the earth within the 2 to 5 Hz at at least one point on the selected area as a passive information signal; and measuring the presence of a spectral anomaly on a spectrum of the passive information signal relative a spectrum of an information signal from an area known not to contain hydrocarbon deposits.

2. The method of claim 1 wherein the passive information signal is recorded for up to 60 minutes.

3. The method of claim 1 wherein at least two receivers of the seismic vibrations are used and placed at a distance to each other of up to 500 meters.

4. The method for detection of hydrocarbons deposits onshore by measuring infrasonic spectral characteristics of microseismic noise of the earth in a selected area, the steps comprising:

placing at least one receiver of seismic vibrations capable of recording at least one data component within a 2 to 5 Hz frequency range over an expected hydrocarbon deposit onshore in the selected area;

generating seismic vibrations using a vibrator;

registering at least once the spectral characteristics of the microseismic noise of the earth within the 2 to 5 Hz at at least one point on the selected area before the generating of the seismic vibrations as a passive information signal and during the generating of the seismic vibrations as an active information signal; and measuring the presence of a spectral anomaly on a spectrum of the active information signal relative to the spectrum of the passive information signal.

5. The method of claim 4 wherein the passive information signal is recorded for up to 20 minutes before the generation of seismic vibrations.

6. The method of claim 4 wherein the generation of seismic vibrations is for at least 3 minutes.

7. The method of claim 4 wherein at least two receivers of the seismic vibrations are used and placed at a distance to each other of up to 500 meters.

8. The method of claim 7 wherein the at least two receivers of the seismic vibrations are placed at a distance of up to 500 meters from the vibrator.

9. A method for detection of hydrocarbon deposits offshore by measuring infrasonic spectral characteristics of microseismic noise of the earth in a selected area, the steps comprising:

placing on a sea bottom at least one receiver of seismic vibrations capable of recording at least one data component within a 2 to 5 Hz frequency range over an expected hydrocarbon deposit;

registering at least once the spectral characteristics of the microseismic noise of the earth within the 2 to 5 Hz at at least one point on the sea bottom as a passive information signal; and measuring the presence of a spectral anomaly on a spectrum of the passive information signal relative a spectrum of an information signal from an area known not to contain hydrocarbon deposits.

10. The method of claim 9 wherein the passive information signal is recorded for at least 40 minutes.

11. The method of claim 9 wherein at least two receivers of the seismic vibrations are used and placed at a distance to each other of up to 500 meters.

12. The method for detection of hydrocarbon deposits offshore by measuring infrasonic spectral characteristics of microseismic noise of the earth in a selected area, the steps comprising:

placing on a sea bottom at least one receiver of seismic vibrations capable of recording at least one data component within a 2 to 5 Hz frequency range over an expected hydrocarbon deposit;

generating seismic vibrations;

registering at least once the spectral characteristics of the microseismic noise of the earth within a 2 to 5 Hz frequency range at at least one point on the sea bottom before the generating of the seismic vibrations as a passive information signal and during the generating of the seismic vibrations as an active information signal; and measuring the presence of a spectral anomaly on a spectrum of the active information signal relative to a spectrum of the passive information signal.

13. The method of claim 12 wherein the passive information signal is recorded for at least 10 minutes before the generation of seismic vibrations.

14. The method of claim 12 wherein at least two receivers of the seismic vibrations are used and placed at a distance to each other of up to 500 meters.

15. The method of claim 14 wherein the at least two receivers of the seismic vibrations are placed at an equal distance from the source of seismic vibrations.

16. The method of claim 12 wherein the generation of seismic vibrations is for at least 5 minutes.

17. A method for monitoring a producing oil and gas field by measuring infrasonic spectral characteristics of microseismic noise of the earth: the steps comprising:

placing at least one receiver of seismic vibrations capable of recording at least one data component within a 2 to 5 Hz frequency range over a producing hydrocarbon deposit at control points;

periodically recording as an information signal the spectral characteristics of the microseismic noise of the earth within 2 to 5 Hz at the control points, and detecting an edge of the hydrocarbon deposit at a control pint at which the spectral anomaly relative to a spectrum from an area known not to contain hydrocarbons disappears.

18. The method as described in claim 17 wherein the passive information signal is recorded in a range of 40 to 60 minutes.

19. The method as described in claim 17 wherein the information signal is recorded before and during the generation of seismic vibrations.

20. The method as described in claim 19 wherein the seismic vibrations are generated for at least 3 minutes.

21. A method for monitoring fill levels of subsurface gas storage by measuring infrasonic spectral characteristics of microseismic noise of the earth, the steps comprising:

placing receivers of seismic vibrations capable of recording at least one data component within a 2–5 Hz frequency range at surface control stations, which approximately define the fill levels of the gas storage;

during gas storage operation, periodically recording as an information signal the spectral characteristics of microseismic noise of the earth within 2 to 5 Hz at each control station; and measuring an absence of a spectral anomaly relative to a spectrum recorded outside of the gas storage, to determine if there is gas below each control station.

22. The method as described in claim 21 wherein the information signal is recorded in a range of 40 to 60 minutes.

23. The method as described in claim 21 further including the step of generating seismic vibrations for at least 3 minutes.

24. The method as described in claim 23 wherein the information signal is recorded before and during the generation of the seismic vibrations.

* * * * *

(12) EX PARTE REEXAMINATION CERTIFICATE (7778th)
United States Patent
Gendelman et al.

(10) Number: US 6,442,489 C1
(45) Certificate Issued: Sep. 28, 2010

(54) METHOD FOR DETECTION AND MONITORING OF HYDROCARBONS

(75) Inventors: Edward Gendelman, Littleton, CO (US); Boris M. Grafov, Moscow (RU); Oleg L. Kuznetsov, Moscow (RU); Haim Sokolin, Jerusalem (IL); Sergei L. Aroutyunov, Pyatigorsk (RU); Sergei M. Karnaukhov, Orenburg (RU); Yuri V. Sirotinsky, Moscow (RU)

(73) Assignee: Direct Petroleum Exploration, Inc., Denver, CO (US)

Reexamination Request:
No. 90/008,658, May 23, 2007

Reexamination Certificate for:
Patent No.: 6,442,489
Issued: Aug. 27, 2002
Appl. No.: 09/365,697
Filed: Aug. 2, 1999

(51) Int. Cl.
*G01N 15/08* (2006.01)

(52) U.S. Cl. .......................... 702/12; 702/13
(58) Field of Classification Search ............. None
See application file for complete search history.

(56) References Cited

U.S. PATENT DOCUMENTS

| | | |
|---|---|---|
| 4,300,220 A | 11/1981 | Goff et al. |
| 4,926,392 A | 5/1990 | Handley et al. |
| 5,181,171 A | 1/1993 | McCormack et al. |
| 5,774,417 A | 6/1998 | Corrigan et al. |
| 5,930,730 A | 7/1999 | Marfurt et al. |

FOREIGN PATENT DOCUMENTS

| | | |
|---|---|---|
| RU | 2008698 C1 | 2/1994 |
| RU | 2022301 C1 | 10/1994 |
| RU | 2045079 C1 | 9/1995 |
| RU | 2054697 C1 | 2/1996 |
| RU | 2091816 C1 | 9/1997 |
| SU | 1702333 A1 | 12/1991 |
| WO | WO 00/33107 | 6/2000 |

OTHER PUBLICATIONS

Hirokazu, Moriya et al., "Precise detection of a P–Wave in low signal to noise signal using time frequency representations of triaxil Hodogram", Sep.–Oct. 1996, Geophysics vol. 61, No. 5, 14 pages.

*Primary Examiner*—Minh T Nguyen

(57) ABSTRACT

A method for detection and monitoring of hydrocarbon deposits by measuring infrasonic spectral characteristics of microseismic noise of the earth. The method is used onshore and offshore for detection of hydrocarbon deposits and for monitoring of producing oil and gas fields and subsurface storage of natural gas. In one method of the invention, at least one receiver of seismic vibrations capable of recording vibrations in the infrasonic range is placed over an area being surveyed. The spectral characteristics of the microseismic noise of the earth recorded within a 2 to 5 Hz frequency range are used as a "passive" information signal. A hydrocarbon deposit is determined by the presence of a spectral anomaly on a spectrum of the passive information signal relative to a spectrum of an information signal from the area known not to contain hydrocarbons.

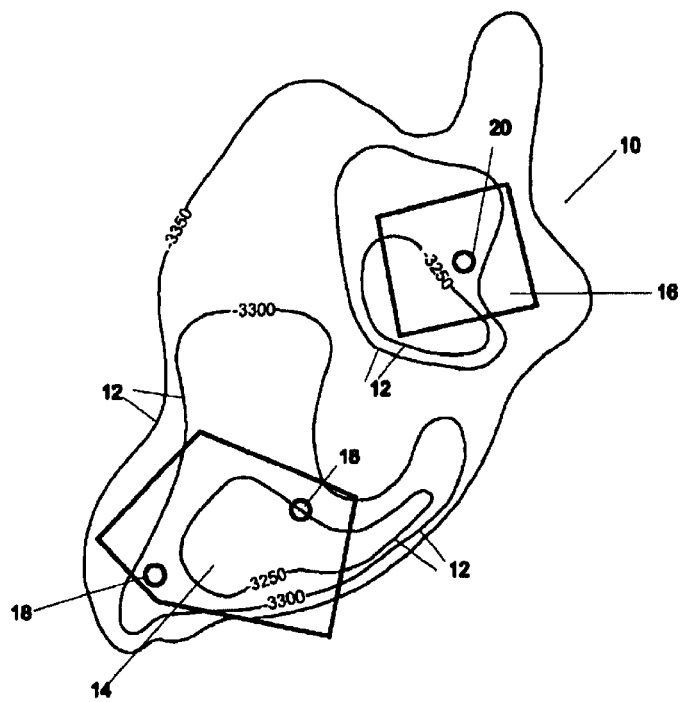

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 12-16 is confirmed.

Claims 1, 4, 9, 17 and 21 are determined to be patentable as amended.

Claims 2-3, 5-8, 10-11, 18-20 and 22-24, dependent on an amended claim, are determined to be patentable.

New claims 25-36 are added and determined to be patentable.

1. A method for detection of hydrocarbon deposits onshore by measuring infrasonic spectral characteristics of microseismic noise of the earth in a selected area, the steps comprising:
    placing at least one receiver of seismic vibrations capable of recording at least one data component within a 2 to 5 Hz frequency range over an expected hydrocarbon deposit onshore in the selected area;
    registering at least once the spectral characteristics of the microseismic noise of the earth within the 2 to 5 Hz *frequency range* at at least one point on the selected area as a passive information signal; and
    measuring the presence of a spectral anomaly on a spectrum of the passive information signal relative a spectrum of an information signal from an area known not to contain hydrocarbon deposits.

4. The method for detection of [hydrocarbons] *hydrocarbon* deposits onshore by measuring infrasonic spectral characteristics of microseismic noise of the earth in a selected area, the steps comprising:
    placing at least one receiver of seismic vibrations capable of recording at least one data component within a 2 to 5 Hz frequency range over an expected hydrocarbon deposit onshore in the selected area;
    generating seismic vibrations using a vibrator;
    registering at least once the spectral characteristics of the microseismic noise of the earth within the 2 to 5 Hz *frequency range* at at least one point on the selected area before the generating of the seismic vibrations as a passive information signal and during the generating of the seismic vibrations as an active information signal; and
    measuring the presence of a spectral anomaly on a spectrum of the active information signal relative to the spectrum of the passive information signal.

9. A method for detection of hydrocarbon deposits onshore by measuring infrasonic spectral characteristics of microseismic noise of the earth in a selected area, the steps comprising:
    placing on a sea bottom at least one receiver of seismic vibrations capable of recording at least one data component within a 2 to 5 Hz frequency range over an expected hydrocarbon deposit;
    registering at least once the spectral characteristics of the microseismic noise of the earth within the 2 to 5 Hz *frequency range* at at least one point on the sea bottom as a a passive information signal; and
    measuring the presence of a spectral anomaly on a spectrum of the passive information signal relative a spectrum of an information signal from an area known not to contain hydrocarbon deposits.

17. A method for monitoring a producing oil and gas field by measuring infrasonic spectral characteristics of microseismic noise of the earth[:]*,* the steps comprising:
    placing at least one receiver of seismic vibrations capable of recording at least one data component within a 2 to 5 Hz frequency range over a producing hydrocarbon deposit at control points;
    periodically recording as an information signal the spectral characteristics of the microseismic noise of the earth within *the* 2 to 5 Hz *frequency range* at the control points[.]*;* and
    detecting an edge of the hydrocarbon deposit at a control [pint] *point* at which the spectral anomaly relative to a spectrum from an area known not to contain hydrocarbons disappears.

21. A method for monitoring fill levels of substance gas storage by measuring infrasonic spectral characteristics of microseismic noise of the earth, the steps comprising:
    placing receivers of seismic vibrations capable of recording at least one data component within a 2-5 Hz frequency range at surface control stations, which approximately define the fill levels of the gas storage;
    during gas storage operation, periodically recording as an information signal the spectral characteristics of microseismic noise of the earth within *the* 2 to 5 Hz *frequency range* at each control station; and
    measuring an absence of a spectral anomaly relative to a spectrum recorded outside of the gas storage, to determine if there is gas below each control station.

25. *The method of claim 1, further comprising:*
    *determining whether a hydrocarbon deposit is present, wherein the presence of a hydrocarbon deposit is determined based on a spectral anomaly of the passive information signal relative to the passive information signal from the at least one point on the selected area from an area known not to contain hydrocarbon deposits, and wherein the presence of a spectral anomaly in the 2 to 5 Hz frequency range indicates the presence of hydrocarbons.*

26. *The method of claim 1, wherein measuring the presence of a spectral anomaly includes a comparative analysis in which the spectrum of the passive information signal from an area known not to contain hydrocarbon deposits is compared to the passive information signal from the at least one point on the selected area, and wherein the presence of a spectral anomaly in the 2 to 5 Hz frequency range indicates the presence of hydrocarbons.*

27. *The method of claim 4, further comprising:*
    *wherein the presence of a hydrocarbon deposit is determined based on the appearance of a spectral anomaly on the information signal spectrum recorded during the generation of seismic vibrations relative to the information signal spectrum recorded at the same point before* the generation of vibrations, and wherein the presence of a spectral anomaly in the 2 to 5 Hz frequency range indicates the presence of hydrocarbons.

28. The method of claim 4, wherein measuring the presence of a spectral anomaly includes taking a product spectrum of the active information signal and the passive information signal, and wherein the presence of a spectral anomaly in the product spectrum within a 2 to 5 Hz frequency range of the product spectrum indicates the presence of hydrocarbons.

29. The method of claim 9, further comprising:
determining whether a hydrocarbon deposit is present, wherein the presence of a hydrocarbon deposit is determined based on the appearance of a spectral anomaly on the passive information signal within the 2 to 5 Hz frequency range from the at least one point on the sea bottom relative to the passive information signal from an area known not to contain hydrocarbons, and wherein the presence of a spectral anomaly in the 2 to 5 Hz frequency range indicates the presence of hydrocarbons.

30. The method of claim 9, wherein measuring the presence of a spectral anomaly includes a comparative analysis in which the spectrum of the passive information signal from an area known not to contain hydrocarbon deposits is compared to the passive information signal from the at least one point on the sea bottom, and wherein the presence of a spectral anomaly in the 2 to 5 Hz frequency range indicates the presence of hydrocarbons.

31. The method of claim 12, further comprising:
determining whether a hydrocarbon deposit is present, wherein the presence of a hydrocarbon deposit is determined based on the appearance of a spectral anomaly in the 2 to 5 Hz frequency range of the active information signal relative to the passive information signal, and wherein the presence of a spectral anomaly in the 2 to 5 Hz frequency range indicates the presence of hydrocarbons.

32. The method of claim 12, wherein measuring the presence of a spectral anomaly includes taking a product spectrum of the active information signal and the passive information signal, and wherein the presence of a spectral anomaly in the product spectrum within a 2 to 5 Hz frequency range of the product spectrum indicates the presence of hydrocarbons.

33. The method of claim 17, further comprising:
determining the presence of a hydrocarbon contact, wherein the presence of a hydrocarbon contact is determined based on disappearance of a spectral anomaly of the Earth's microseismic noise in the 2 to 5 Hz frequency range.

34. The method of claim 17, wherein detecting an edge of the hydrocarbon deposit includes a comparative analysis in which the spectrum of a passive information signal from an area known not to contain hydrocarbon deposits is compared to the information signal from a control point, and wherein the disappearance of a spectral anomaly in the 2 to 5 Hz frequency range indicates the presence of hydrocarbons.

35. The method of claim 21, further comprising:
determining the absence of natural gas in the storage underneath a control station based on an absence of spectral anomalies of the Earth's microseismic noise in the 2 to 5 Hz frequency range.

36. The method of claim 21, wherein measuring the presence of a spectral anomaly includes a comparative analysis in which the spectrum of a passive information signal recorded outside of the gas storage is compared to the information signal from one of the control stations, and wherein the presence of a spectral anomaly in the 2 to 5 Hz frequency range indicates the presence of hydrocarbons.

* * * * *